US009575936B2

(12) United States Patent
Romano et al.

(10) Patent No.: US 9,575,936 B2
(45) Date of Patent: *Feb. 21, 2017

(54) WORD CLOUD DISPLAY (71) Applicant: Verint Systems Ltd., Herzilya Pituach (IL)

(72) Inventors: Roni Romano, Even Yehuda (IL); Galia Zacay, ganei-Tikva (IL); Rahm Fehr, Tel Aviv (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,761

(22) Filed: Jul. 16, 2015

(65) Prior Publication Data
US 2016/0019885 A1 Jan. 21, 2016

Related U.S. Application Data (60) Provisional application No. 62/025,746, filed on Jul. 17, 2014.

(51) Int. Cl.
*G06F 17/27* (2006.01)
*G10L 15/00* (2013.01)
*G10L 17/00* (2013.01)
*G06F 17/21* (2006.01)

(52) U.S. Cl.
CPC .................................. *G06F 17/214* (2013.01)

(58) Field of Classification Search
None
See application file for complete search history.

(56) References Cited

U.S. PATENT DOCUMENTS

| | | | | |
|---|---|---|---|---|
| 5,317,673 A | * | 5/1994 | Cohen | G10L 15/144 704/232 |
| 8,447,604 B1 | * | 5/2013 | Chang | H04N 9/475 434/185 |
| 8,825,488 B2 | * | 9/2014 | Scoggins, II | H04N 9/475 704/235 |
| 8,825,489 B2 | * | 9/2014 | Scoggins, II | H04N 9/475 704/235 |
| 8,874,432 B2 | * | 10/2014 | Qi | G06F 17/271 704/9 |

(Continued)

*Primary Examiner* — Satwant Singh
(74) *Attorney, Agent, or Firm* — Meunier Carlin & Curfman (57) ABSTRACT

Machine learning-based methods to improve the knowledge extraction process in a specific domain or business environment, and then provides that extracted knowledge in a word cloud user interface display capable of summarizing and conveying a vast amount of information to a user very quickly. Based on the self-training mechanism developed by the inventors, the ontology programming automatically trains itself to understand the domain or environment of the communication data by processing and analyzing a defined corpus of communication data. The developed ontology can be applied to process a dataset of communication information to create a word cloud that can provide a quick view into the content of the dataset, including information about the language used by participants in the communications, such as identifying for a user key phrases and terms, the frequency of those phrases, the originator of the terms of phrases, and the confidence levels of such identifications.

20 Claims, 9 Drawing Sheets (56) References Cited

U.S. PATENT DOCUMENTS

| | | | |
|---|---|---|---|
| 9,066,049 B2* | 6/2015 | Scoggins, II | H04N 9/475 |
| 9,164,667 B2* | 10/2015 | Speer | G06F 3/04842 |
| 2010/0057536 A1* | 3/2010 | Stefik | G06F 17/2785 |
| | | | 705/14.71 |
| 2013/0144863 A1* | 6/2013 | Mayer | G06F 21/6218 |
| | | | 707/711 |
| 2013/0166303 A1* | 6/2013 | Chang | G06F 17/30787 |
| | | | 704/258 |
| 2013/0232263 A1* | 9/2013 | Kelly | H04L 43/10 |
| | | | 709/224 |
| 2014/0222719 A1* | 8/2014 | Poulin | G06F 19/345 |
| | | | 706/11 |
| 2016/0055848 A1* | 2/2016 | Meruva | G10L 15/22 |
| | | | 704/275 |

* cited by examiner

WORD CLOUD DISPLAY

The present disclosure relates to the field of automated data processing, and more specifically to the application of ontology programming to process and analyze communication data and to efficiently convey that data to a user.

An ontology is a formal representation of a set of concepts, and the relationships between those concepts in a defined domain. The ontology models the specific meanings of terms as they apply to that domain, and may be devised to incorporate one or several different spoken and/or written languages. Communication data may exist in the form of an audio recording, streaming audio, a transcription of spoken content, or any written correspondence or communication. In the merely exemplary context of a customer service interaction, the communication data may be a transcript between a customer service agent or an interactive voice response (IVR) recording with a customer/caller. The interaction may be via phone, via email, via internet chat, via text messaging, etc. An ontology can be developed and applied across all types of communication data, for example, all types of customer interactions (which may include interactions in multiple languages), to develop a holistic tool for processing and interpreting such data.

The disclosed solution uses machine learning-based methods to improve the knowledge extraction process in a specific domain or business environment, and then provides that extracted knowledge in a word cloud user interface display capable of summarizing and conveying a vast amount of information to a user very quickly. By formulizing a specific company's internal knowledge and terminology, the ontology programming accounts for linguistic meaning to surface relevant and important content for analysis. For example, the disclosed ontology programming adapts to the language used in a specific domain, including linguistic patterns and properties, such as word order, relationships between terms, and syntactical variations. Based on the self-training mechanism developed by the inventors, the ontology programming automatically trains itself to understand the domain or environment of the communication data by processing and analyzing a defined corpus of communication data. Then, the developed ontology can be applied to process a dataset of communication information and to create a word cloud that can provide a quick view into the content of the dataset, including the information about the language used by the participants in the communications, such as identifying for a user key phrases and terms, the frequency of those phrases, the originator of the terms of phrases, and the confidence levels of such identifications.

The ontology is built on the premise that meaningful terms are detected in the corpus and then classified according to specific semantic concepts, or entities. Once the main terms are defined, direct relations or linkages can be formed between these terms and their associated entities. Then, the relations are grouped into themes, which are groups or abstracts that contain synonymous relations. Relations are detected in interactions and surfaced during the system's self-training process. A theme is essentially a single concept defined by its associated relations, which represent that same concept among multiple interactions in the corpus. Themes provide users with a compressed view of the characteristics of interactions throughout the corpus. Themes may be identified according to the exemplary methods described herein.

Themes provide a basis for analytic functions of the ontological software. Accordingly, themes may be provided names, or identifiers, that summarize or identify the content of a theme so that large amounts of theme data can be integrated and displayed in a user-friendly fashion—e.g. in a word cloud display.

BRIEF DESCRIPTION OF THE DRAWINGS

FIG. 6 provides an exemplary word cloud display.

DETAILED DISCLOSURE

In the context of customer service interactions, communication content may exist as various forms of data, including but not limited to audio recording, streaming audio, transcribed textual transcript, or documents containing written communications, such as email, physical mail, text messages, etc. While the present disclosure is exemplified herein by describing an embodiment involving the analysis of audio data, such as recorded audio transcripts, it is to be understood that in alternative embodiments of oral or written communications may be used or analyzed.

An ontology as disclosed is a formal representation of a set of concepts and the relationships between these concepts. In general, an ontology will focus on a specific domain or general context within which the individualized terms or classes as described herein are interpreted. As a non-limiting example, the ontologies described herein are with respect to customer service interactions. A particular ontology may be defined for a specific domain, such as financial services, consumer products, subscription services, or some other service interactions.

Figure 1:
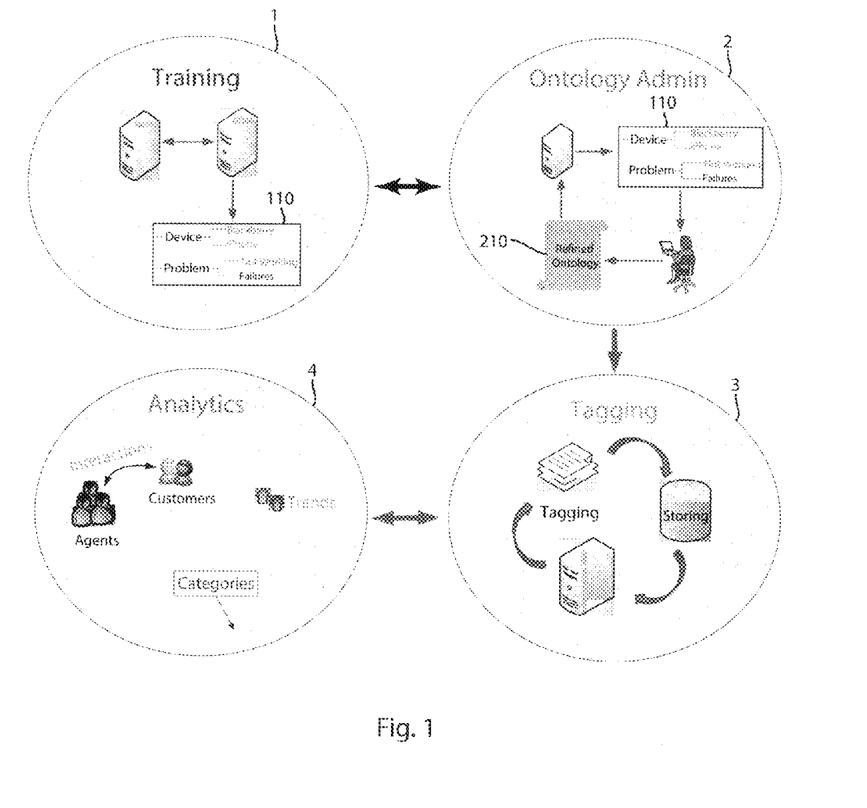
FIG. 1 depicts an exemplary embodiment of the ontology process and programming disclosed herein.

The presently disclosed ontology solution incorporates four main stages. As seen in FIG. 1, the four main stages include training 1, ontology administration 2, ontology tagging 3, and ontology analytics 4. The training step 1 involves internal machine learned in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology. A detailed analysis of each stage is addressed in turn.

In the training phase 1, communication data is transformed into a usable format and then analyzed. For example, audio data from a customer interaction between a customer service agent/IVR and a customer/caller can be automatically transcribed into a textual file through speech recognition techniques. However, challenges exist in automatically interpreting the content and sentiments conveyed in a human communication, such as a customer service interaction. An ontology, which generally refers to a collection of entities and their relations, is one way in which an automated interpretation of a customer service interaction can be developed, organized, and presented as disclosed herein.

Generally, an ontology as disclosed herein includes terms which are individual words or short phrases that represent the basic units or concepts that might come up in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. All words in the corpus can only be associated with one term, and each term can only be counted once.

Classes are broader concepts that encapsulate or classify a set of terms. Classes describe semantic concepts to which classified terms are related. It is also to be understood that classes may also classify or encapsulate a set of subclasses in which the terms are classified. Non-limiting examples of classes, may be include "objects", "actions", "modifiers", "documents", "service", "customers", or "locations". However, these are not intended to be limiting on the types of classes, particularly the types of classes that may appear in an ontology directed to a specific or specialized domain.

The classes, subclasses, and terms are connected by a plurality of relations which are defined binary directed relationships between terms and classes/subclasses or subclasses to classes. In a non-limiting example, the term "pay" is defined under the class "action" and the term "bill" is defined in the class "documents". Still further binary directed relationships can be defined between these class/term pairs. The action/pay pair is related to the document/bill pair in that the payment action requires an underlying document, which may be a bill. In another non-limiting example, the term "broken" is defined in the class "problems" and the term "iPhone" is defined in the class "device". The problem/broken pair can also have a directed relationship to the "devices" class in which the "iPhone" term is a specific example as represented by the devices/iPhone pair.

Figure 5:
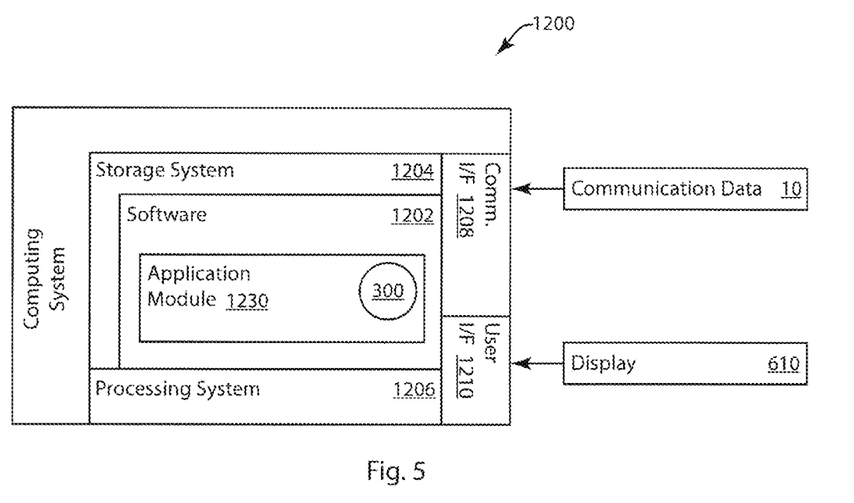
FIG. 5 is a system diagram of an exemplary embodiment of a system for automated language model adaptation implementing an ontology training module.

FIG. 5 is a system diagram of an exemplary embodiment of a system 1200 for automated language model adaptation implementing an ontology training module 300. The system 1200 is generally a computing system that includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described in herein in further detail, including execution of the ontology training module 300.

Although the computing system 1200 as depicted in FIG. 5 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210. The user interface 1210 portion of the system 1200 may connect to a display 610, which may be any display known in the art.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

Figure 2:
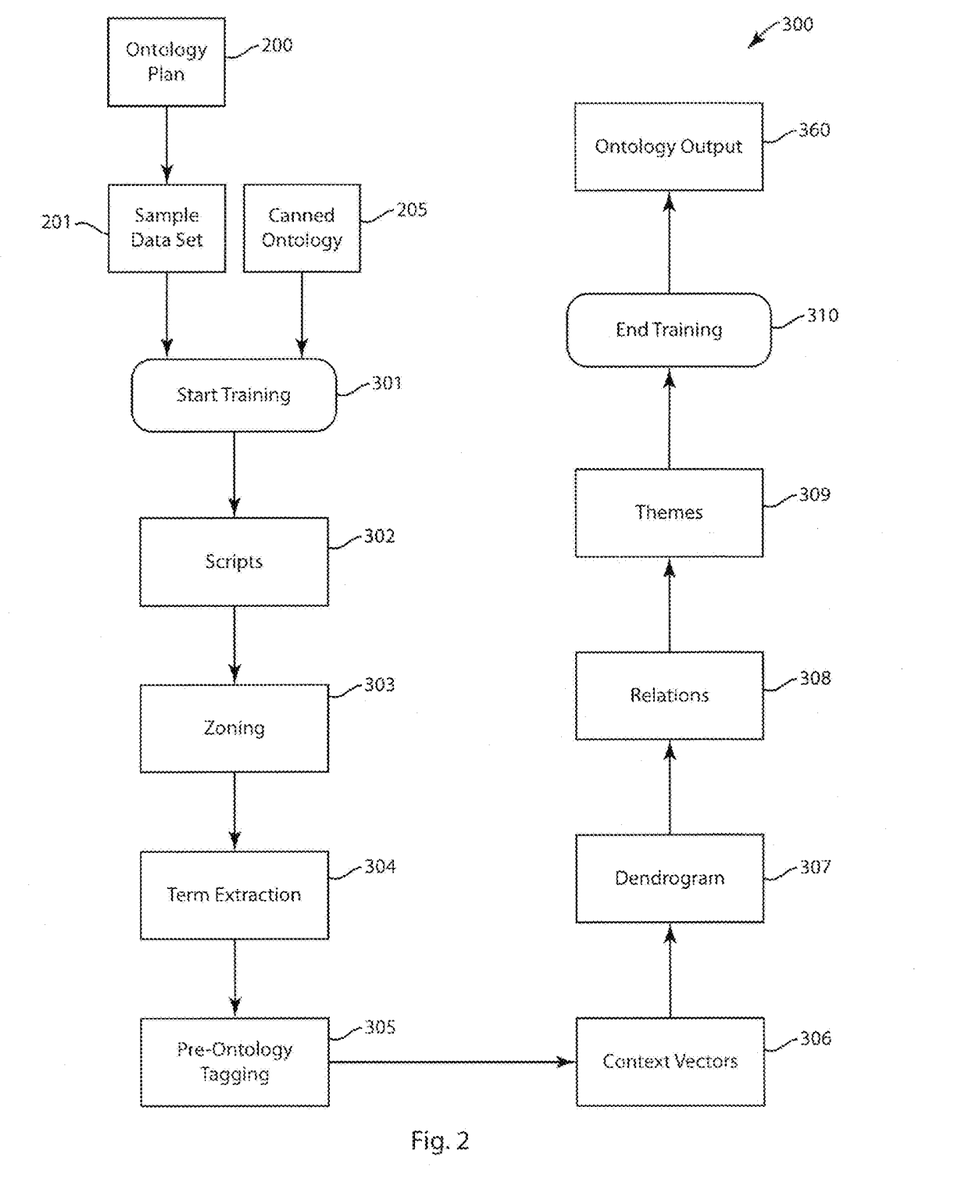
FIG. 2 is a schematic diagram of an embodiment of a process for ontology development.

FIG. 2 represents an overview of an exemplary training phase 1 for developing an initial ontology 110. The initial ontology 110 is built by a step-by-step pipeline process that applies various features to the defined data. These features include the extracting and surfacing of words and phrases in the corpus that helps users make non-trivial observations about a customer-specific domain.

As exemplified in FIG. 2, developing an ontology may begin with the prerequisite steps of developing an ontology plan 200 and sample data set 201. Developing an ontology plan 200 involves assessing a customer's business needs to develop a comprehensive plan for the ontological structure that can process the customer's data to provide the desired result. For example, developing an ontology plan 200 could involve determining how many ontologies are required for a specific customer. For example, customers may decide they need multiple ontologies to handle specialized types of data that can be categorized into different business domains.

Developing the sample data set 201 involves accumulating a good and varied range of data for each planned ontology. The data required for this purpose preferably originates from different time periods, for example, within about a month previous to the date of implementing the training step. The data is validated and gathered from different types of defined sources. Preferably, the ontology training process 1 is not executed until a certain, predefined amount of data is gathered for the training. For example, a configured scheduler may monitor the data gathering process and count the number of records or amount of data added. When the number of records or amount of data in the sample data set 201 reaches that predetermined amount, the scheduler may execute the ontology training process 1.

Once the sample data set 201 is fully developed, the training may begin. At step 301, the sampled data set 201 for each planned ontology 200 is fed into the training module 300. The module 300 then identifies scripts 302 within the sample data set 201. Scripts are lengthy, repeated patterns that appear in the data set 201. For example, a standard phrase spoken by a customer service agent, such as "Hello, how can I help you?" may comprise a script. Next, the module 300 executes a zoning process 303 that segments conversations within a defined corpus, or data set, into meaning units. Meaning units 68 are sequences of words that express an idea, such as may be the equivalent of sentences. An example of a meaning unit in a customer service context would be the customer statement "I would like to buy a phone."

After the zoning process has been completed for the sample data set 201, the module 300 executes term extraction 304. Term extraction 304 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 300 executes a pre-ontology step 305 that tags all overlapping terms in a non-overlapping way. Longer terms are generally preferred over shorter ones. For example, the term "my phone number" is counted as one term, rather than two—i.e. "my phone" and "my phone number."

Following the pre-ontology process step 305, the module 300 processes the sample data set 201 to identify context vectors 306. Context vectors 306 are linkages between defined terms in the corpus, or data set, and the words that appear before or after each term. For example, the term "account" could be preceded by any of several terms, such as "have an," "to your." "a prepaid," "cancel my," or "my husband's." Likewise, the term "account" could be followed by any number of terms, such as "holder's", "receivable", or "been canceled." These so called left and right context vectors contain the predictive words for a main term, also referred to as a pivot term.

Identifying context vectors 306 forms the basis for the next step, building dendrograms 307, which is building a hierarchical clustering of terms. The training system uses the premise that terms that share contextual similarity and have similar linguistic characteristics share the same general meaning. In other words, terms with similar context vectors may be synonyms (e.g., purchase/buy), conceptually interchangeable (e.g., days, dates, locations), ontologically similar (e.g., financial transactions). Terms that share these characteristics are good candidates to be inserted in the ontology as a group of terms with similar meanings. In order to accomplish that, the system scans the context vectors of all terms created in the previous phase and clusters together terms with similar context vectors. A dendrogram, for example, may center around the term "purchase." The left context vector (preceding term) may be "want to", "need to", etc. While the right context vector (following term) may be "an i-phone", "the service", "high-speed internet." Initially, all detected terms in the corpus are located with similar terms in clusters on the dendrogram. Then, the dendrogram is transformed into a contextual similarity tree that only contains the stronger similarity clusters of the original dendrogram based on a similarity score algorithm that scores the similarity of the terms in the associated context vectors. During this transformation process, some terms are eliminated and some are grouped or merged with other meaningful terms. Preferably, the minimum number of terms in a dendrogram cluster is four, in order to provide a meaningful analysis of the grouped terms. By way of example, the following terms "purchase" and "buy" have similar context vectors:

Term: Purchase Left Context Vector (Before Term): Want To, Need To, Have To
  Right Context Vector (After Term): An i-Phone, The Service, High-Speed Internet
Term: Buy Left Context Vector (Before Term): Want To, Need To, Must
  Right Context Vector (After Term): i-Phone, High-Speed Internet, A Service That These two terms would be combined into one dendrogram cluster. The ontological premise is that there is a contextual similarity between these terms and therefore, they are clustered together. A set of dendrogram clusters can be presented as a hierarchical structure, such as a tree structure, where terms and clusters that are related are placed near one another in the structure.

After the dendrogram 307 development, relations 308 are developed within the sample data set 201. Relations 308 are linkages or relationships between the defined terms in the corpus. For example, "cancel>account," "speak with>supervisor," and "buy>new iPhone" are exemplary relations 308. The system defines a concise number of strong, meaningful relations according to certain pre-defined policies or rules. Those strong relations are given a higher score, and thus are given preference over other, lower-scoring relations.

Then, based upon the established relations 308, the system identifies, or surfaces, themes 309 appearing within the dataset. Themes 309 are groups or categories of relations that are similar in meaning. A theme 309 represents a concept and is defined by its associated relations. A theme encapsulates the same concept among several interactions. Themes 309 allow users to easily and efficiently understand the characteristics of interactions throughout the corpus. For example, the theme "got an email" might correspond to several relations, including "got the email," "got confirmation," "received an email," "received an email confirmation," etc. In a call center data set, for example, one theme may represent a concept expressed in several different calls. In that way, a theme can provide a summary, or a compressed view, of the characteristics of the interactions in a communications data set. Preferably, a relation is assigned to only a single theme. Additionally, preferably only relations are tagged in the tagging phase 3 of a corpus. Themes are used in the analytics phase 4, and act as building blocks employed by analytics applications or modules.

Specifically, in one embodiment, themes can be identified using the following algorithm, or method. First, the term pairs, or relations, in a corpus are scored according to the following algorithm:

$$\text{score}(\text{term1}, \text{term2}) = \frac{\text{joint\_count}(\text{term1}, \text{term2}) \times \text{length\_in\_letters}([\text{term1 term2}])}{\text{average\_distance}(\text{term1}, \text{term2}) + 1}$$

In the above algorithm, "joint count" represents the number of times the terms appear together in the specified order in the dataset (or a designated subset of the dataset), the "length in letters" represents the length of the words (letters or characters), taken together, in the term set (or relation). Those numbers are multiplied together and divided by the "average distance" between the terms plus 1. The average distance may be calculated as the average number of words that appear between the two terms. Alternatively, the average distance could be calculated as the average number of letters or characters between the two terms. Strong, or high scoring, term sets are those that are long (have many letters) with high appearance count and that appear close together. Low scoring term sets are short, appear infrequently, and are far apart in the data set (indicating loose context). High scoring term pairs, or relations, are valued over low scoring pairs.

After the relations, or term pairs, are scored, the relations are listed in descending order based on that score. That list of scored relations is then truncated so that only a certain number of top scoring relations are maintained. For example, the list may be truncated to retain a pre-defined constant number of relations. Alternatively, a predefined percentage of the relations may be kept. Before or after the list is truncated, the scores for each of the relations in the list may be normalized by assigning them a new score according to their rank in the list. Preferably the score is normalized in descending order, with the best pair (highest scoring term pair) receiving the highest normalized score and the worst pair (lowest scoring term pair) receiving the lowest normalized score.

Figure 3:
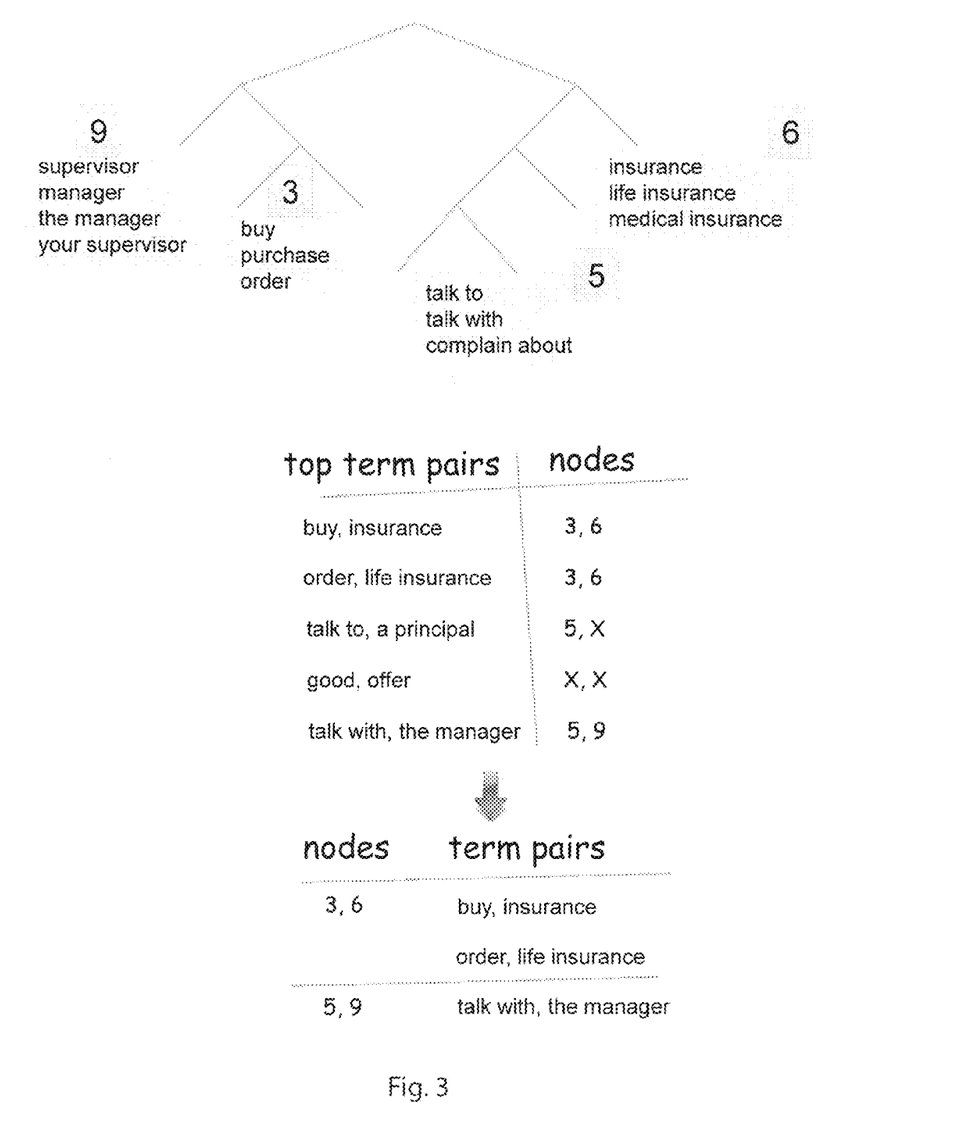
FIG. 3 depicts an exemplary embodiment of a dendrogram.

Then, for each term of each relation in the list, the corresponding dendrogram cluster, or parent node, if it exists, is identified. If found, the term pair is assigned to the identified dendrogram nodes pair, and a list of nodes is developed. Relations, or terms pairs, belonging to the same nodes pair can be grouped together. For example, as seen in FIG. 3, each dendrogram cluster receives a node number. Each term pair is then correlated with its corresponding node, or dendrogram cluster, pair. For instance, in FIG. 3 the term pair buy>insurance and ordcer>life insurance both correlate to the node pair 3>6. Accordingly, those term pairs could be grouped together and identified according to their node pair.

As is also illustrated in FIG. 3, some terms may not correspond to any dendrogram cluster and thus may not have a corresponding node number. For example, in FIG. 3 the term pair talk to>a principal, the term "a principal" was not identified as being associated with any dendrogram cluster and thus did not receive a node number. In those instances node numbers may still be identifiable, or associatable, if the unassociated or un-grouped terms can be affiliated with node pairs or dendrogram clusters having textually similar terms. Such affiliation can be assessed by using character trigram similarity, which compares the literal similarity between the words in two separate relations or terms. Character trigram similarity assesses the similarity of words by assessing the words in the terms together, and specifically by comparing the letters of each of the words in each of the relations with one another. One way to do that is by parsing the relations or terms into letter triplets and determining whether those letter triplets appear in each relation or term. The character trigram similarity of two terms can be assessed according to the following algorithm:

$$\text{similarity}(a, b) = \frac{\sum_{\text{trigram } t \in a,b} \min(\text{count of } t \text{ in } a, \text{count of } t \text{ in } b)}{\text{number of trigrams belonging to } a + \text{number of trigrams belonging to } b}$$

In this way, the letter strings in each term are compared and their similarity is determined. Terms that have sufficiently similar letter strings in them are grouped together, for example in the same dendrogram cluster, or node. Thereby, previously unassociated terms can be placed into a group.

Preferably, the themes are expanded to incorporate as many of the identified terms and relations as possible. Since data sets may commonly be derived from speech-to-text translation algorithms, and because those algorithms are imperfect and often make slight mistranscriptions, it is desirable to use algorithms that can associate textually similar terms together—e.g., managers and manager, Sunday and Monday. Thus, as described above, unassociated relations can be assimilated into the established node groupings by comparing them with the already-grouped relations, for example using character trigram similarity. For relations that remain unassociated after such a comparison with the already-grouped relations, additional associations can be made by comparing the unassociated relations with one another. For example, the character trigram similarity algorithm can be used to compare and group the unassociated relations with one another. In some embodiments, the threshold for clustering or grouping these previously unassociated relations may be higher than the threshold for grouping the unassociated relations with the already-grouped relations. After all comparisons are completed, relations whose terms do not have any similarity linkages to other terms and thus cannot be clustered with other relations, are discarded as unimportant Once all of the terms are placed into node number pairs or are discarded as unimportant, the remaining list of node number pairs indicates groups of term pairs. This list could appropriately be termed a list of "theme candidates" because it contains groups of relations that could potentially be identified as themes. The list of theme candidates can be paired down using any number of techniques. For example, the theme candidates can be scored by averaging the scores (or normalized scores) of its original term pair members. Alternatively or additionally, the list of theme candidates can be compared to a pre-created, or "canned", list of important terms or themes. The "canned" list can be one that is created based on similar datasets, for example based on datasets belonging to another user in the same or similar industry. The theme candidates that appear on the "canned" list of important themes or terms could then be elevated as important, or high scoring, themes. Likewise, the list of theme candidates could be compared to a "canned" list of unimportant terms. The theme candidates that appear on the list can be removed, and purged because they are insignificant and do not add anything to the analysis.

Additionally, the theme candidates could be scored based on their number of members, with the candidates having the most members receiving the highest score. The theme candidates can also be scored according to their entity consensus, where themes having terms that belong to the same entity or groups of entities are scored higher than those with terms belonging to disparate entities. Another scoring means is by diversity, where themes with a greater number of unique terms on either side of the relations receive a higher score. Further, the list of theme candidates can also be refined by a user, for example, at the ontology administration stage 2. In one embodiment, the theme candidates are scored according to a number of different metrics, such as those listed above, and the then the scores are added together or averaged to calculate a final score. The theme candidates with the highest final scores can then be classified or identified as themes and used as a foundation for the analytics structure.

Figure 4:
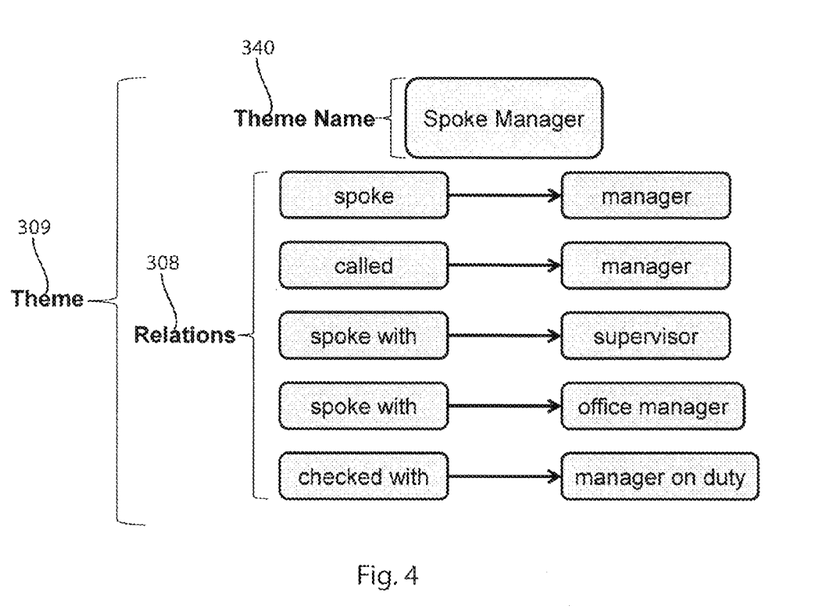
FIG. 4 is an exemplary display conveying information about themes in a dataset.

Themes can be displayed by displaying all of the relations comprising that theme and providing statistics about the appearance of such relations and/or the terms therein. In order to display a theme, or to create useful user interfaces displaying and conveying information about themes and about a group of themes in a dataset, each theme should be given a unique identifier, or theme name. For example, as seen in FIG. 4, information about themes 309 and relations 308 in a communication data set can be displayed by displaying the terms therein and connecting them with lines. Exemplary FIG. 4 demonstrates a display showing the theme name 340, data about the theme in the corpus, and the relations that comprise the theme.

The theme name 340 is an identifier for the theme 309 that may be used, for example, in user interfaces as a shortcut for conveying information about the theme 309 using only a short string of words and/or characters. For example, as seen in FIG. 6, the theme names 340 can be used in a Word Cloud 410, which indicates key data about a large number of themes at one glance. The theme name 340 can be established by any number of methods. For example, the theme name 340 can be created based on the top relation or relations in the dataset, or a particular subset of the dataset being analyzed. Determination of the top relations may be based on any number of factors, or a combination thereof. For example, the top relations may be those receiving the highest term pair score (described above). Alternately, the top relations may be the most common relations from that theme appearing in the dataset. In still other embodiments, the top relations may be those with the highest normalized scores, or the highest final scores (described above).

Turning back to FIG. 4, the theme name 340 may be devised by concatenating the terms of the first relation—"spoke" and "manager". In another embodiment, the name 340 may be created from, for example, the top three relations. In FIG. 4, assuming that the relations are listed in descending order with the top scoring relations listed first, the top three relations would be "spoke>manager", "called>manager" and "spoke with>supervisor". The theme name can be created from the terms in these three relations, for example by pairing the terms of the relations so that each of the first terms of the relation are listed together and each of the second terms are listed together. Implementing such a method, the theme name 340 for the theme in FIG. 4 could be, for example, "spoke, called, spoke with >manager, supervisor". In still other embodiments, the terms of the top relations could be collected and concatenated in other ways. The purpose of using more than the top relation in the theme name may be to ensure that the entire sentiment or idea of the theme is expressed. The top relation in the dataset may not be enough to encompass the entire idea of the theme, and thus using two or more of the top relations may lead to more accurate names. However, using multiple relations to create the names may lead to longer, more cumbersome names that are hard to incorporate into user interfaces. Thus, it may be desirable to use shorter names based on the top relation in certain analytics functions or displays, while using the longer, potentially more accurate names in other analytics functions or displays.

Additionally, multiple themes can be viewed at one time. For example, all of the themes represented in a corpus may be displayed. Alternatively, a portion of the themes may be displayed, such as the most common themes or the themes most related to a particular term or subject, such as a term or subject identified by a user. As exemplified in FIGS. 6 through 8, a word cloud 410 can be employed to quickly present a user with information about a dataset, such as the most important or prominent themes therein. In one embodiment demonstrated in FIG. 6, the word cloud 410 conveys information about a dataset, such as a customer service call. The word cloud 410 of FIG. 6 employs font size and color to convey information about the subject matter and the participants in the communication dataset. More important terms and phrases appear in larger font relative to terms and phrases of lesser importance in the dataset. Important terms and phrases are those that indicate a subject of a dataset, such as the purpose of a customer service interaction. They may comprise theme names of important or prominent themes of the dataset. Furthermore, color, shading, font type, or other visual differentiator may be employed to indicate the speaker, or originator, of the important term or phrase.

In the example of FIG. 6, font color is used to indicate the speaker. In the word cloud 410 of FIG. 6, which is for a dataset comprising one or more customer service calls, the important terms or phrases used by a customer are shown in green, while important terms or phrases by a customer service agent appear in blue. The word cloud 410 of FIG. 6 indicates that the subject matter of the relevant customer service interaction(s) was a customer discussing cancelling their internet service and being frustrated. For example, the word "cancel" 412 appears large and in green, indicating that "cancel" was an important subject of the communication information originating from the customer in the dataset. Likewise, the phrase "I apologize" 414 appears large and in blue, indicating that "I apologize" was an important subject of the communication information originating from the customer service agent in the dataset.

Many other words and phrases appear in the word cloud 410, and their relative size indicates the dominance, or importance, of those words or phrases to the meaning, or subject matter, of the communication information contained in the dataset. Thereby, the word cloud 410 provides a quick and easily digested summary of the content of a dataset. Various embodiments of the word cloud 410 may be employed to identify key phrases or terms in a dataset. The analytics applications 4 may be employed to identify important terms or phrases by identifying terms that are used frequently in a dataset. Further, the analytics application 4 may attach higher weight to terms that are more unique in a dataset compared with general language. The analytics application 4 may also identify the speaker, or originator of each phrase.

Moreover, the analytics application may also identify a confidence level for each identified word or phrase indicating how likely it is that the word or phrase was identified and classified correctly. In some embodiments, the confidence level may also be visually indicated in the word cloud 410, such as by color, shade, font type, size, or other appearance quality of the word or phrase in the word cloud. For instance, in one embodiment the words and/or phrases associated with higher confidence levels may appear in a bold color shade, whereas those words and phrases associated with lesser confidence levels may appear in a relatively lighter color shade.

Figure 7:
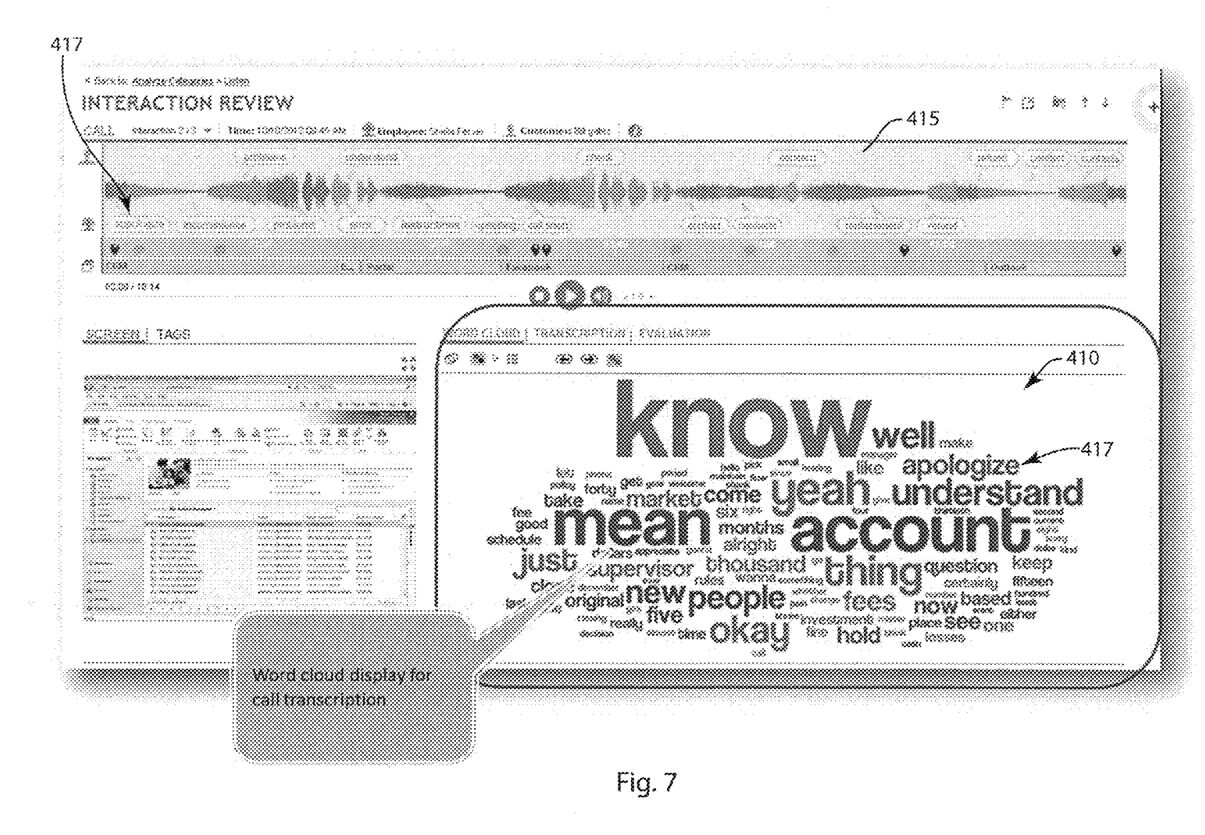
FIG. 7 provides another exemplary word cloud display.

Turning to FIG. 7, the word cloud 410 may be displayed on a display 610 and the user interface 1210 in conjunction with other features, such as an Interaction Review 415 display/interface. The Interaction Review 415 may be associated with the word cloud 410 and may allow a user to view where the words or phrases identified in the word cloud fall within a sequential dataset. Further, the Interaction Review 415 may provide the same color coding for the participant identification as is employed in the word cloud 410. In the example of FIG. 7 a dataset comprising a customer service call is represented. In both the word cloud 410 and the Interaction Review 415, the data originating from the customer is presented in green and the data originating from the agent is blue. Furthermore, the words and phrases identified in the word cloud 410 are also identified in the Interaction Review 415. For example, the word apologize 417 identified in medium-sized font in the word cloud 410 is also identified in the Interaction Review 415. This enables a user to locate the word or phrase, such as apologize 417, within the dataset. The Interaction Review 415 display/interface may further allow a user to view or play the located portion of the dataset containing the identified word or phrase. In the embodiment of FIG. 7, where the dataset is a recorded customer service call, the Interaction Review 415 may allow a user to play the portion(s) of the call containing the identified word or phrase. In another embodiment where the dataset contains written interactions, the Interaction Review 415 may allow a user to view a portion(s) of the written dataset containing the identified word or phrase.

Figure 8:
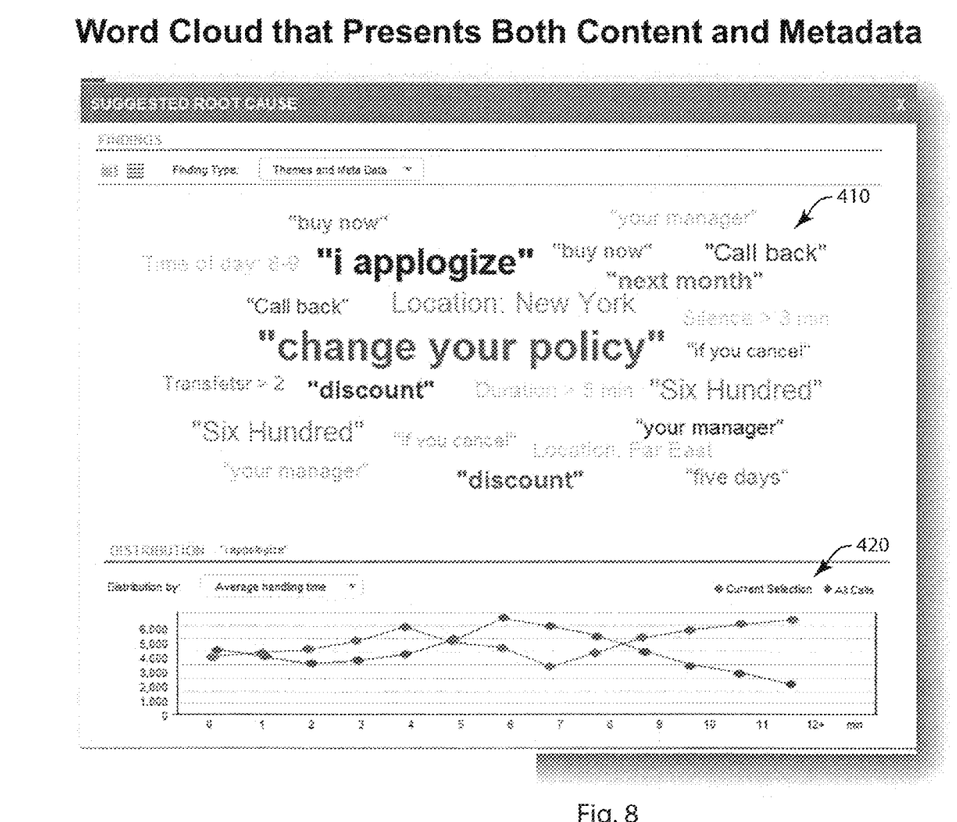
FIG. 8 provides another exemplary word cloud display.

FIG. 8 depicts another embodiment of a word cloud 410 comprising, in addition to important words or phrases identified for a dataset, important metadata. The important metadata may comprise information regarding, for example, the duration of a communication, location of participants, the time that the communication took place, the total or average silence duration, or any other metadata associated with a communication information dataset that might be relevant to a user's inquiry. The metadata may be processed by an analytics application 4 to determine what metadata is most important in a dataset to a user. Alternatively or additionally, a user may select what metadata information should be included or displayed in a word cloud 410.

In still other embodiments, the important words or phrases and metadata may be included in a word cloud based on their correlations with another word, phrase, or theme. In the exemplary word cloud of FIG. 8, important words or phrases and metadata are shown that have a relatively strong correlation to the theme "1 apologize."

In some embodiments, the word cloud 410 may be interactive to a user. For example, a user may be able to click on an item in a word cloud 410, such as a particular word or phrase, and information about that word or phrase may appear in the display. In the example of FIG. 7, the word cloud 410 may be configured to allow a user to select a word or phrase therein. Selecting a word or phrase in the word cloud may cause the display and/or auditory play of one or more portions of the dataset containing that word or phrase. For example, clicking on a word or phrase may cause display or auditory play of the first or next incident of that word or phrase in the dataset. In another embodiment, clicking on an element in the word cloud 410 may bring up information and/or statistics related to that element. In the example of FIG. 8, selecting the phrase "I apologize" 414 in the word cloud 410 may cause display of a Distribution Trend Line 420 conveying information regarding the distribution of that phrase in the dataset, or within the context of a larger dataset, or in comparison to a reference dataset. For example, the Distribution Trend Line 420 shown in FIG. 8 shows the distribution trend of average handling time for those calls containing the theme "I apologize" compared to the average handling time for the full dataset containing all calls.

Figure 9:
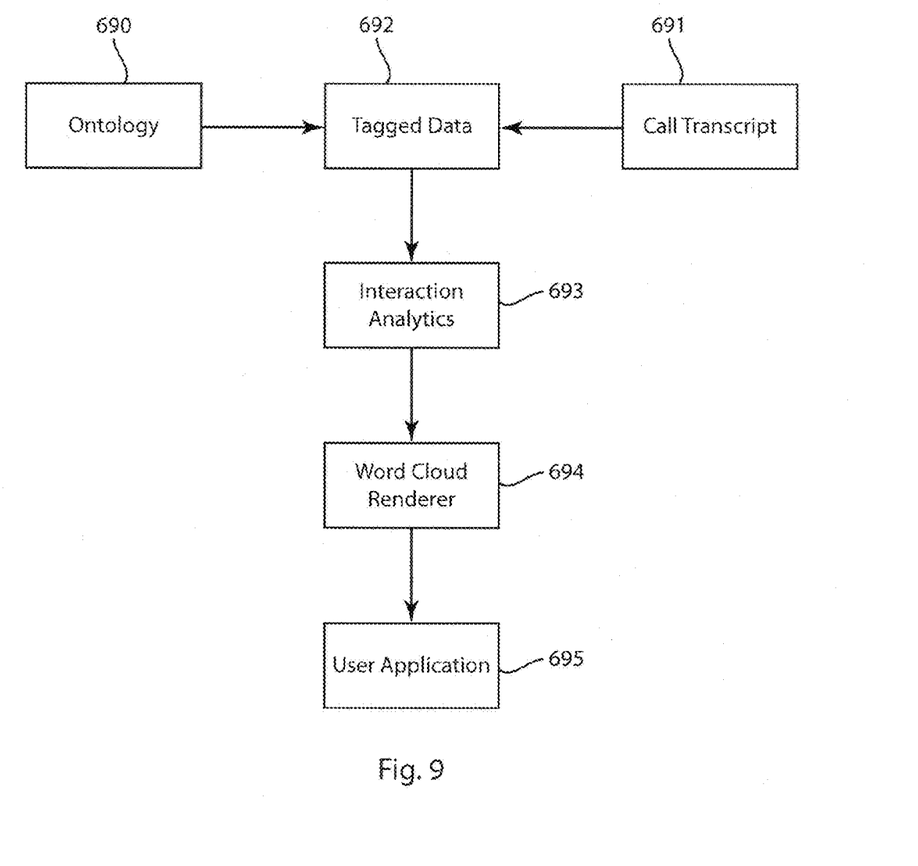
FIG. 9 provides an exemplary embodiment of a method for generating a word cloud display conveying ontological information about a dataset.

FIG. 9 depicts an embodiment method and system for developing a word cloud. The exemplary method and system is applied to a dataset comprised of a call transcript 691. However, it should be understood that the method and system may be applied to any dataset comprising communication information, which may be written or audio or in any format as described above. To begin, the ontology 690, such as that created according to the above-described methods and systems, is applied to the call transcript 691 such that the call transcript is tagged to create tagged data 692. Analytics applications 4 are then applied to the tagged data at the interaction analytics step 693, which identifies important words, phrases and/or metadata from the tagged data 692 to be included in the word cloud. Thereafter, the word cloud renderer 694 renders the word cloud. The word cloud is displayed to and interfaced by the user via the user application 695.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for developing an ontology via a computer system and displaying information about a set of communication data, wherein the ontology is a structural representation of language elements and the relationships between those language elements within a domain stored in memory of the computer system, the method comprising:

receiving, by a training module of the computer system, a set of communication data, wherein the communication data is voice audio;

transcribing, by the training module, the set of communication data into textual files;
processing the textual files, by the training module, to identify scripts within the textual files, wherein scripts are repeated patterns that appear in the set of communication data;
following the identification of scripts, executing a zoning process by the training module that segments conversations within the textual files into meaning units, wherein each meaning unit is a sentence;
after the zoning process has been completed, executing a term extraction process by the training module that evaluates the meaning units to extract terms from the textual files, wherein a term is a short word or phrase;
after executing the zoning process, executing a pre-ontology tagging process by the training module that tags all the terms such that any given term does not scan more than one meaning unit and such that any two given terms do not overlap each other;
following the pre-ontology tagging, processing the textual files by the training module to identify context vectors, wherein the context vectors are linkages between the tagged terms in the textual files and the words that appear before or after each of those tagged terms in the textual files;
after identifying the context vectors, building dendrograms by the training module based on the context vectors, wherein each dendrogram is a hierarchical cluster that centers around a given tagged terns;
after the development of the dendrograms, developing relations within the set of communication data by the training module based on the dendrograms, wherein a relation is a pair of tagged terms that appear in proximity to one another in the textual files;
after the developing of the relation, surfacing themes that appear within the set of communication data by the module based on the relations, wherein a theme is a group of relations that are similar in meaning, wherein each surfaced theme includes a respective theme name;
displaying theme information of the surfaced themes in a word cloud via a user application, wherein the theme information includes the respective theme names, and wherein the word cloud is a cluster of important words and/or phrases from the set of communication data; and
storing the tagged terms, the themes, and the relations in a database as an ontology.

2. The method of claim 1, wherein a color of each important word and/or phrase conveys information about the important word and/or phrase.

3. The method of claim 2 wherein the color indicates a speaker of the important word and/or phrase.

4. The method of claim 1 wherein a size of each important word and/or phrase conveys information about the important word and/or phrase.

5. The method of claim 4 wherein the size of each important word and/or phrase conveys a frequency of appearance of the important word or phrase in the set of communication data.

6. The method of claim 1 wherein a font of each important word and/or phrase conveys information about the important word and/or phrase.

7. The method of claim 6 wherein the font of each important word and/or phrase conveys an average location of the theme within the set of communication data.

8. The method of claim 1 wherein one of a size, color, or font of each important word and/or phrase conveys a relevance of the important word and/or phrase to a search term or a selected term.

9. A method of developing an ontology via a computer system and displaying information about a set of communication data, wherein the ontology is a structural representation of language elements and the relationships between those language elements within a domain stored in memory of the computer system, the method comprising:
creating an initial ontology by:
receiving, by a training module of the computer system, a set of communication data, wherein the communication data is voice audio;
transcribing, by the training module, the set of communication data into textual files;
processing the textual files, by the training module, to identify scripts within the textual files, wherein scripts are repeated patterns that appear in the set of communication data;
following the identification of scripts, executing a zoning process by the training module that segments conversations within the textual files into meaning units, wherein each meaning unit is a sentence;
after the zoning process has been completed, executing a term extraction process by the training module that evaluates the meaning units to extract terms from the textual files, wherein a term is a short word or phrase;
after executing the zoning process, executing a pre-ontology tagging process by the training module that tags all the terms such that any given term does not span more than one meaning unit and such that any two given terms do not overlap each other;
following the pre-ontology tagging, processing the textual files by the training module to identify context vectors, wherein the context vectors are linkages between the tagged terms in the textual files and the words that appear before or after each of those tagged terms in the textual files;
after identifying the context vectors, building dendrograms by the training module based on the context vectors, wherein each dendrogram is a hierarchical cluster that centers around a given tagged term;
after the development of the dendrograms, developing relations within the set of communication data by the training module based on the dendrograms, wherein a relation is a pair of tagged terms that appear in proximity to one another in the textual files;
after the developing of the relations, surfacing themes that appear within the set of communication data by the training module based on the relations, wherein a theme is a group of relations that are similar in meaning, wherein each surfaced theme includes a respective theme name; and
storing the tagged terms, the themes, and the relations in a database as the initial ontology;
providing the initial ontology to a user for review by at least displaying theme information of the surfaced themes in a word cloud via a user application, wherein the theme information includes the respective theme names, and wherein the word cloud is a cluster of important words and/or phrases from the training set of communication data;
receiving feedback from the user to refine the initial ontology to create a refined ontology; and
storing the refined ontology.

10. The method of claim 9, wherein a color of each important word and/or phrase conveys information about the important word and/or phrase.

11. The method of claim 10 wherein the color indicates a speaker of the important word and/or phrase.

12. The method of claim 9 wherein a size of each important word and/or phrase conveys information about the important word and/or phrase.

13. The method of claim 12 wherein the size of each important word and/or phrase conveys a frequency of appearance of the important word or phrase in the set of communication data.

14. The method of claim 9 wherein a font of each important word and/or phrase conveys information about the important word and/or phrase.

15. The method of claim 14 wherein the font of each important word and/or phrase conveys an average location of the theme within the set of communication data.

16. The method of claim 9 wherein one of a size, color, or font of each important word and/or phrase conveys a relevance of the important word and/or phrase to a search term or a selected term.

17. A non-transitory computer readable medium having instructions stored thereon for developing an ontology via a computer system and displaying information about a set of communication data, wherein the ontology is a structural representation of language elements and the relationships between those language elements within a domain stored in memory of the computer system, the method comprising:

receiving, a set of communication data, wherein the communication data is voice audio;

transcribing the set of communication data into textual files;

processing the textual files to identify scripts within the textual files, wherein scripts are repeated patterns that appear in the set of communication data;

following the identification of scripts, executing a zoning process that segments conversations within the textual files into meaning units, wherein each meaning unit is a sentence;

after the zoning process has been completed, executing a term extraction process that evaluates the meaning units to extract terms from the textual files, wherein a term is a short word or phrase;

after executing the zoning process, executing a pre-ontology tagging process that tags all the terms such that any given term does not span more than one meaning unit and such that any two given terms do not overlap each other;

following the pre-ontology tagging, processing the textual files to identify context vectors, wherein the context vectors are linkages between the tagged terms in the textual files and the words that appear before or after each of those tagged terms in the textual files;

after identifying the context vectors, building dendrograms based on the context vectors, wherein each dendrogram is a hierarchical cluster that centers around a given tagged term;

after the development of the dendrograms, developing relations within the set of communication data based on the dendrograms, wherein a relation is a pair of tagged terms that appear in proximity to one another in the textual files; and after the developing of the relations, surfacing themes that appear within the set of communication data based on the relations, wherein a theme is a group of relations that are similar in meaning, wherein each surfaced theme includes a respective theme name;

displaying theme information of the surfaced themes in a word cloud via a user application, wherein the theme information includes the respective theme names, and wherein the word cloud is a cluster of important words and/or phrases from the set of communication data;

storing the tagged terms, the themes, and the relations in a database as an ontology.

18. The non-transitory computer readable medium of claim 17, wherein a color of each important word and/or phrase conveys information about the important word and/or phrase.

19. The non-transitory computer readable medium of claim 18 wherein the color indicates a speaker of the important word and/or phrase.

20. The non-transitory computer readable medium of claim 17 wherein a size of each important word and/or phrase conveys information about the important word and/or phrase.

* * * * *